April 5, 1966
M. D. NAPPER ETAL
3,244,769
TREATMENT OF RECYCLE CATALYST STREAM
IN SULFURIC ACID ALKYLATION
Filed Oct. 16, 1963
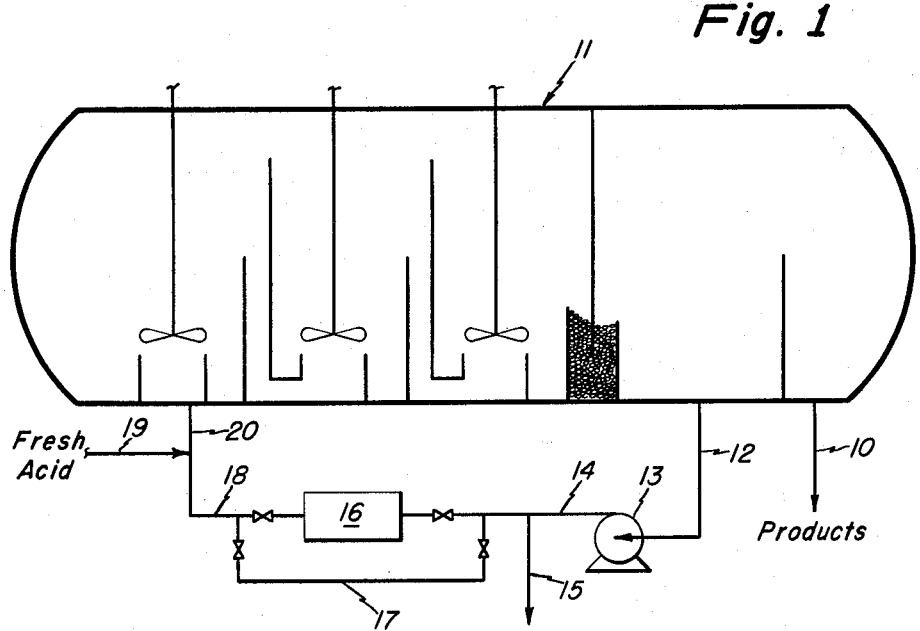
Fig. 1
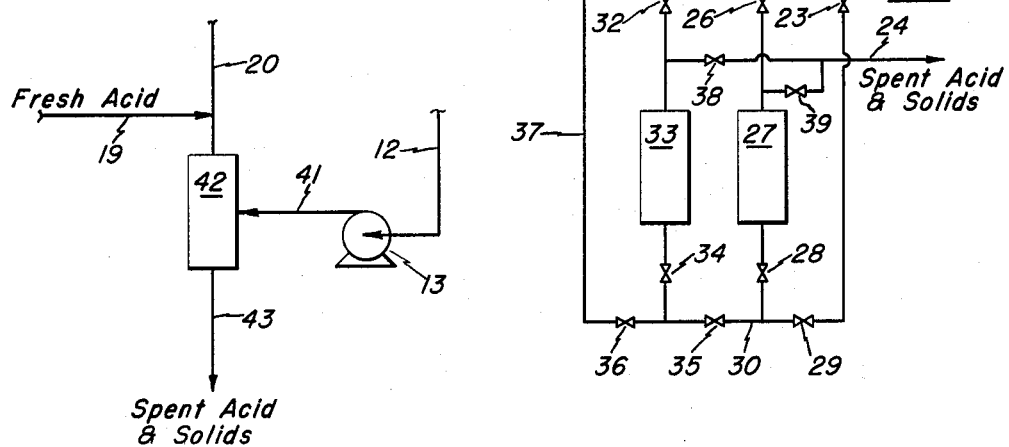
Fig. 3
Fig. 2
INVENTORS.
Maxwell D. Napper
Richard A. Burge
BY
ATTORNEY United States Patent Office 3,244,769
Patented Apr. 5, 1966

3,244,769
TREATMENT OF RECYCLE CATALYST STREAM
IN SULFURIC ACID ALKYLATION
Maxwell D. Napper and Richard A. Burge, Casper, Wyo.,
assignors to Standard Oil Company, Chicago, Ill., a
corporation of Indiana
Filed Oct. 16, 1963, Ser. No. 316,618
5 Claims. (Cl. 260—683.62)

This invention relates to the alkylation of hydrocarbons with olefins. It is especially concerned with an improved process for the alkylation of hydrocarbons with olefins in the presence of a sulfuric acid catalyst to produce branched-chain hydrocarbons having high octane numbers. Such products are suitable as components for motor and/or aviation fuels, are clean-burning, and have very good tetraethyl lead susceptibility.

Alkylation in general, including the alkylation of hydrocarbons in the presence of a sulfuric acid catalyst, is discussed in the Kirk-Othmer Encyclopedia of Chemical Technology, second edition, vol. 1, John Wiley and Sons, Inc., pages 882–901 (1963) and by E. K. Jones in Advances in Catalysis, vol. 10, Academic Press, Inc., pages 165–195 (1958).

A major problem in the alkylation of hydrocarbons with a sulfuric acid catalyst is the formation and accumulation of solid impurities in the liquid catalyst. Such insoluble impurities have been identified as iron sulfate, free carbon and tar. Other impurities may also be present. These insoluble impurities accumulate during extended continuous operation.

In the alkylation of hydrocarbons through the use of a sulfuric acid catalyst, an emulsion is formed between the hydrocarbons and the sulfuric acid. During the time that the emulsion exists, the alkylation reactions proceed. Of course, side reactions also occur. Such side reactions, as the polymerization of the olefins, are detrimental to the life of the acid catalyst and the quality of the product. The strength of the acid is greatly weakened and the octane number of the product is lowered. It is desirable that the emulsion exist for only that time which is necessary for the reaction, and that at the termination of the reaction the emulsion be broken down into its component parts and these be separated from one another in as short a time as possible. The longer the emulsion is permitted to remain, the more opportunity is given for the production of these detrimental side reactions.

The presence of the above-identified impurities causes the emulsion to be tightly held together, that is, it cannot be separated easily into its component parts. The result is that the separation of the acid and hydrocarbon phases following the reaction proceeds at a relatively slow rate and the undesirable side reactions are promoted. The catalyst strength is reduced by these various soluble reaction products tightly held by the emulsion over long periods of time. The concentration of the acid is maintained at the required level by the withdrawing of a part of the used acid and replacing it with concentrated make-up acid. As the emulsion stability of the catalyst increases, the catalyst's effectiveness is more rapidly reduced, and the addition of replacement acid is accelerated. Furthermore, the octane number of the product remains at a lower level than would be present if the emulsion were easily broken down.

We have discovered that the effective removal of the insoluble impurities from the recycle acid catalyst in a sulfuric acid process minimizes the reduction of the acid strength and maintains the product quality by preventing tight emulsification. Upon the effective removal of the impurities, the emulsion is not held tightly and its separation occurs at a sufficient rate to substantially reduce the secondary degradation reactions. In addition, the amount of make-up acid to maintain the acid strength at a fairly constant high level is reduced and an improved octane number results.

Our invention comprises modifying a sulfuric-acid alkylation reaction system so that continuous removal of the insoluble impurities from the acid can be performed when needed to enhance the reaction, improve product quality, and reduce catalyst requirements. Such removal of impurities can be advantageously carried out by the introduction of a filter or centrifuge into the recycle system.

The invention may be more fully understood by referring to the attached drawings. In as much as these are schematic diagrams, only the more important pieces of equipment are shown. Those items which are not necessary for an intelligent discussion of the process or which might be recognized as being necessary by those skilled in the art have been omitted.

FIGURE 1 is a diagrammatic illustration showing a simplified system for accomplishing the improved alkylation process of our invention.

FIGURE 2 is a flow plan for a more desirable type of permanent installation than that presented in FIGURE 1. A back-flush system is provided to prolong filter life. Back-flushing is accomplished when spent acid is discarded by reversing the flow through one of the filters.

FIGURE 3 illustrates the use of a centrifuge in place of the filters. The heavy insoluble materials are discharged continuously to spent acid storage together with a small stream of spent acid.

In FIGURE 1, spent acid is removed from reaction vessel 11 through line 12, from where it is pumped by pump 13 through line 14, filter 16, and lines 18 and 20 back into vessel 11. From time to time, fresh acid is added via inlet 19 to the purified acid prior to its return to vessel 11. As needed, spent acid may be withdrawn from the recycle system via outlet 15. When the content of the insoluble impurities is low and the proper emulsion stability is present, that is, the emulsion readily separates into its component parts, the filter 16 is not required and may be bypassed by the use of bypass 17. Of course, if the filter is plugged or needs other maintenance, it may be bypassed while the repairs are being made. Alkylation products are removed from vessel 11 through line 10.

If the recycle system is as shown in FIGURE 2, the spent acid obtained from line 12 is pumped by pump 13 through line 21 into lines 25 and 31 and through the respective filters 27 and 33. The filtered acid is returned to the reaction vessel via lines 30, 37 and 20. Appropriate valves are opened or closed to permit the desired flow. Fresh acid is added to the system as needed via inlet 19. The pressure relief valve 40 is in the system to eliminate any pressure build-up that might be caused by plugged filters. The filters may be back-flushed by reversing the flow of spent acid through one of them and removing the spent acid and solids by way of line 24. This may be done each time that spent acid is removed from the system. For example, to back-flush filter 27, valves 26, 35 and 38 would be closed while valves 23, 29, 28, 32, 34, 36 and 39 would be open. Spent acid would be pumped through lines 21, 22 and 31. From line 22, it would flow through lines 30 and 25, picking up the solids, and out of the system through line 24. Simultaneously, spent acid would flow through line 31, filter 33, lines 30, 37 and 20. Thus, one of the filters can be cleaned while the other is continuing to treat the recycled acid. When the back-flush of the filter and the removal of spent acid has been completed, the filter can be returned to service; and, if necessary, the other filter can be back-flushed.

When the recycle system is as shown in FIGURE 3, spent acid is pumped from line 12 by pump 13 through line 41 into centrifuge 42, where the heavy insoluble materials, together with a small stream of spent acid, are removed via outlet 43 while the purified acid is discharged via line 20 back to the reaction vessel. Fresh acid is added to the system via line 19, as needed.

It can readily be seen that the system described in each of the above diagrams depends upon a means for removing the solids from the acid catalyst as it is being recycled. The removal is accomplished by either a filter or a centrifuge which is installed in the recycle portion of the system.

A commercial installation similar to the one shown in FIGURE 1 was operated for a number of days. The alkylation reactor was a Kellogg cascade type reactor which has been described by E. K. Jones in Advances in Catalysis, vol. 10, Academic Press, Inc., pages 188–190 (1958). In this installation the recycle stream was divided into two slip streams. The filter was used on one of these streams only. This stream was made up of about 50% of the material being recycled. The filter consisted of a metal shell which was fabricated from two exchanger heads about two feet in diameter. A three-inch pad of "Fiberglas" constituted the filter medium. This "Fiberglas" was manufactured by the Owens-Corning Fiberglas Corporation and marketed under their catalog No. 800. The flow rate of material passing through this filter was about 30–100 gals./min.; the total amount of material being recycled was about 50–150 gals./min.

The results of the commercial test are as follows:

| Date | Acid Usage, Lbs. Acid/Gal. Total Alkylate | Solids Content, Vol. percent |
|---|---|---|
| April 13 | 0.29 | 0.25 |
| 14 | 0.33 | |
| 15 | 0.29 | |
| 16 | 0.30 | |
| 17 | 0.30 | 0.15 |
| 18 | 0.22 | |
| 19 | 0.26 | 0.10 |
| 20 | 0.21 | |
| 21 | 0.23 | |
| 22 | 0.18 | |
| 23 | 0.18 | 0.05 |

By reducing the amount of solid impurities in the acid from 0.25% to 0.05%, the acid usage was reduced from about 0.3 pound of acid per gallon of alkylate to 0.18 pound of acid per gallon of alkylate.

Another short test run revealed similar results. Shortly after starting up the unit on fresh acid, the spent acid contained 0.5 volume percent insoluble material. The spent acid was then filtered; and after 5 days of filtration, all the sediment had disappeared from the acid. The acid usage, which was 0.45 pound of acid per gallon of alkylate before filtration, was reduced to 0.25 pound of acid per gallon of alkylate at the end of 5 days.

In each of these tests, only about 50% of the acid being recycled at any particular time was passed through the filter. Yet, the results indicate that the quantity of insoluble material suspended in the acid can be reduced to essentially zero and the desired strength of the acid can be maintained by the use of much less fresh acid. In addition, a very high level was maintained for the octane number of the total alkylate. In the first test mentioned above, this level was kept at 97–98 CFR–R (clear).

Although a centrifuge was not used in commercial operation, removal of the insoluble material by a centrifuge was accomplished in the laboratory. The results from this laboratory test were comparable to those obtained when a filter was employed.

When the content of insoluble material is at a very low level, no treatment of the recycle acid stream is needed and the filter or other separatory means may be bypassed. As the amount of insoluble material increases, the filter may be returned to service. A subsequent reduction of the detrimental impurities with an associated improvement in catalyst usage and an alkylate of a fairly constant high-octane level should result. This has been shown by additional tests.

Material balances have revealed that in the attainment of this low level of impurities, we do not recover as much contaminant as indicated by analyses performed on the spent acid prior to and after the filtration treatment. Apparently passage through the filter produces a coalescing of the sulfuric-acid-hydrocarbon emulsion. As a result of this, at least some of the solid impurities settle out of the fluid stream somewhere along the system. Such a removal from the stream apparently in no way impairs the performance of the alkylate system.

Care must be exercised so that filter plugging does not occur. Sediment removed from the filter during these tests was found to contain free carbon, iron sulfate and a tarry material similar to acid sludge.

In each of the above examples, a Kellogg cascade reaction system was employed. It is not intended that our invention be limited to an alkylation reaction system of the Kellogg cascade type, but rather that it can be used with any sulfuric acid reaction system requiring recirculation of catalyst to the reaction zone. Furthermore, although only filters and a centrifuge have been set forth as means for separating and removing insoluble materials from the acid catalyst, our invention is not limited to these means, but rather is intended to include any means which might satisfactorily bring about the separation and removal of the impurities from the recycled acid.

What is claimed is:

1. In the alkylation of hydrocarbons in the presence of a sulfuric acid catalyst wherein an emulsion is formed between said hydrocarbons and said acid catalyst in a reaction vessel, said emulsion is broken, spent acid catalyst and hydrocarbon product phases are separated, and at least a portion of the separated acid catalyst is recycled to said reaction vessel for further emulsification, and wherein solid impurities accumulate in said acid catalyst in amounts which increase the stability of said emulsion to an undesirable level, the improvement which comprises treating at least a portion of said separated acid catalyst in the recycle system to remove said solid impurities from said acid catalyst prior to the return of said acid catalyst to said reaction vessel.

2. Process of claim 1 wherein the removing of said solid impurities from said catalyst is done by filtering said solid impurities from said catalyst as it is being recycled.

3. Process of claim 1 wherein the removing of said solid impurities from said catalyst is done by centrifuging the said catalyst as it is being recycled.

4. Process of claim 1 where isoparaffinic hydrocarbons are being alkylated with olefins in the presence of a sulfuric acid catalyst.

5. Process of claim 1 where $C_4$–$C_7$ isoparaffinic hydrocarbons are being alkylated with $C_3$–$C_5$ olefins in the presence of a sulfuric acid catalyst.

References Cited by the Examiner

UNITED STATES PATENTS

| | | | |
|---|---|---|---|
| 1,769,476 | 7/1930 | Teitsworth | 208—13 |
| 2,893,954 | 7/1959 | Ten Have et al. | 208—256 |
| 2,894,050 | 7/1959 | Stiles | 260—683.62 |
| 3,175,023 | 3/1965 | Gross et al. | 260—683.62 |

OTHER REFERENCES

Perry: Chemical Engineers' Handbook, 3rd. ed., McGraw-Hill, N.Y., 1950, pages 964, 992 and 997.

DELBERT E. GANTZ, *Primary Examiner.*

ALPHONSO D. SULLIVAN, *Examiner.*